Nov. 16, 1926.  
F. A. KENNEY  
1,607,084  
LENS FOR AUTOMOBILE HEADLIGHTS  
Filed May 26, 1925
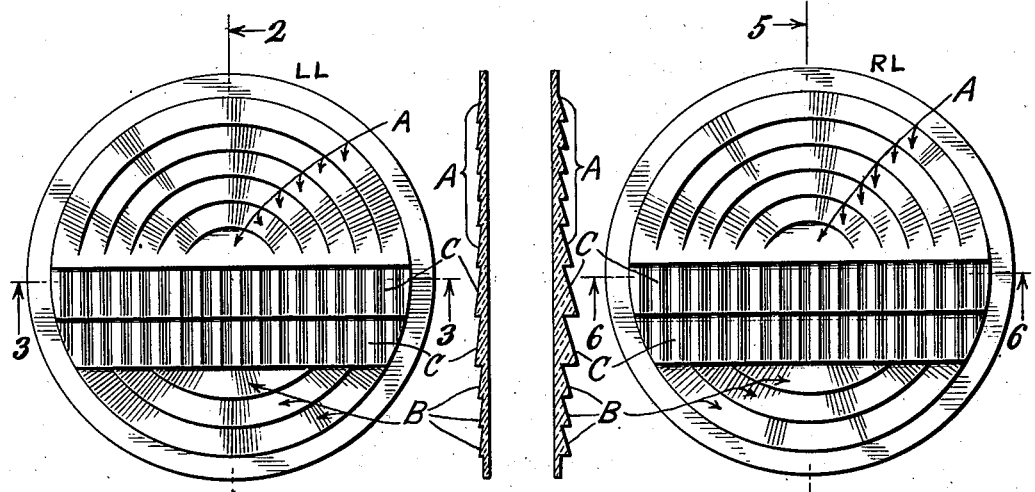
Fig.1.   Fig.2.   Fig.5.   Fig.4.
    
Fig.3.   Fig.6.
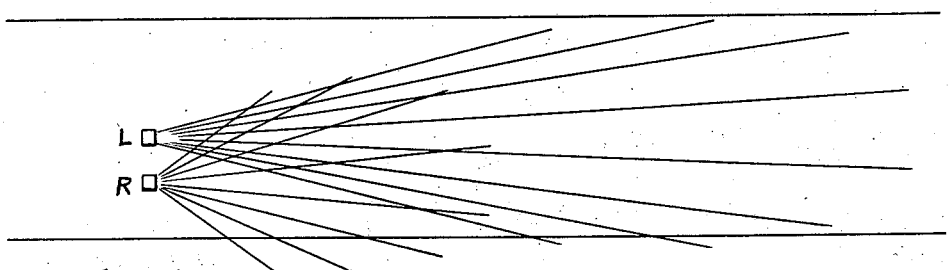
Fig.7.
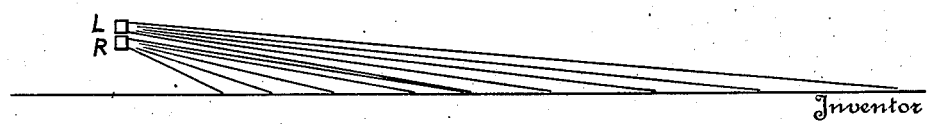
Fig.8.
Inventor  
Frank A. Kenney.  
By  
Attorney Patented Nov. 16, 1926.

1,607,084

UNITED STATES PATENT OFFICE.

FRANK A. KENNEY, OF DENVER, COLORADO.

LENS FOR AUTOMOBILE HEADLIGHTS.

Application filed May 26, 1925. Serial No. 32,946.

This invention relates to improvements in systems of automobile illumination and has reference more particularly to the construction of the lenses for the headlights.

The headlights that are almost universally used on automobiles for road illumination have several objectionable features among which mention may be made of the fact that they project rays of light upwardly in such a direction that they cause a glare that blinds the drivers of approaching automobiles and often cause serious accidents to occur.

The objectionable features of the present automobile illumination have long been recognized and many ways of overcoming the same have been proposed, none of which, however, have been universally adopted.

It is obvious that the only light that is usefully employed is the light that strikes the surface of the road and that therefore that portion of the light that is projected upwardly serves no useful purpose whatever, but is merely a source of danger, for reasons already explained.

Proper road illumination not only requires that a sufficient amount of light shall strike the road surface to make the road visible but it also requires a proper distribution. The road surface directly in front of the car should be well illuminated so that the driver may see any defects in the road in time to avoid them. In addition to this it is quite necessary, especially for fast driving, that the road shall be fairly well illuminated for a considerable distance in front of the car so that the driver may see other vehicles or pedestrians in time to avoid the same and so that turns in the road may be perceived in time to make the necessary preparations. Where the road is to be illuminated the required distance ahead of the automobile, it is sometimes very difficult to avoid objectionable glare as the road surface is often undulating to such an extent that light that would be satisfactory on a level road will be highly objectionable at times. It is therefore very difficult to secure proper road illumination by means of a single lamp or two lamps having an identical distribution of light.

It is the object of this invention to produce a system of illumination employing two lamps each provided with a lens that gives a specifically different distribution of light. The lens employed on the right hand lamp is so constructed that it causes the light rays to be directed downwardly upon the roadway quite close to the front of the car and to spread the light over the entire roadway. This lamp gives a satisfactory illumination for slow driving or on good safe roads. The left hand lamp is provided with a similar lens that throws the light farther ahead and has a smaller angle of spread. This lamp gives the light required for fast driving. As the light from the left hand lamp may be objectionable to the drivers of machines traveling in the opposite direction, it is preferable to provide a switch for dimming one or both of the lamps.

I have embodied my invention in a pair of lenses that I have illustrated on the accompanying drawings and which I will now proceed to describe in detail, reference for this purpose being had to the drawing in which:

Fig. 1 is a view of the rear surface of the left hand lens;

Fig. 2 is a vertical section taken on line 2—2, Fig. 1;

Fig. 3 is a horizontal diametrical section taken on line 3—3, Fig. 1;

Fig. 4 is a view of the rear surface of the right hand lens;

Fig. 5 is a vertical diametrical section taken on line 5—5, Fig. 4;

Fig. 6 is a horizontal diametrical section taken on line 6—6, Fig. 4;

Fig. 7 is a diagrammatic plan view showing the horizontal distribution of the light upon the road, and Fig. 8 is a view showing the distribution of light in a vertical plane, the right hand lamp being shown as if it were on a lower level than the left hand lamp for the purpose of clearness.

In the drawing I have designated the right and left hand headlights of the automobile by the letters R and L respectively, and the corresponding lenses as RL and LL. The lenses are both similar in appearance and are each provided with a group of concentric prisms which have been designated by the letter "A". These prisms are all located above the diameter of the lens and taper upwardly so as to refract the light in a downward direction. Another group of arcuate prisms which I have designated by the letter "B" occupies the lower portion of each lens. These prisms also taper upwardly. Intermediate the two groups of arcuate prisms "A" and "B" are two straight horizontal prisms "C". These prisms also taper upwardly. It will be noted from Figs. 2 and 5 that the prisms on the right lens have a greater upward taper than those of the left lens, so that it will refract the light downwardly at a greater angle than the left lens. The two horizontal prisms "C" have their rear surfaces corrugated in a vertical direction. Referring now more particularly to Figs. 3 and 6, it will be noticed that the corrugations on the prisms "C" of the right lens are deeper than those of the left lens, whereby they effect a more pronounced lateral distribution of the light, in the manner indicated in Fig. 7. The refractive power of the prisms "A", "B" and "C" must be sufficient to keep the light rays down within the legal requirements. The light that passes through the right lens is bent downwardly at a sharper angle than the light that passes through the left hand lens and will therefore strike the roadway closer to the automobile. That part of the light that passes through the prisms "C" of the right lens will be spread laterally at a considerable angle, so as to illuminate the right side of the road and also spread some distance to the left of the machine. The distribution of light from the right lens is suitable for city driving, or on good roads and where the car travels at a moderate speed. On country roads and where a high speed is maintained, it is necessary to illuminate the road a farther distance ahead and this is accomplished by the left hand lamp whose prisms have smaller angularity. When meeting traffic instead of dimming both lamps in the manner now commonly done, the left lamp only may be dimmed or turned off entirely. This leaves the right hand lamp at its full strength which gives a good illumination of the roadway without interfering in any way with the vision of approaching drivers.

It will be apparent from the explanation given above that the effect produced is due to the combined action of the two different lenses which cooperate to produce the desired result. The right hand lens has prisms with greater angularity which refract the light downwardly at a greater angle than the left lens. This causes a greater sidewise dispersion of the light so that the right lamp alone gives a good illumination of the roadway immediately in front of the car and for some distance ahead.

The left hand lens having prisms of less angularity will refract the light to a less degree with the result that the light strikes the roadway at a greater distance ahead of the car. This lens is therefore the one that is depended upon mostly for fast driving and for driving on strange roads where it is essential that the driver shall be able to see the roadway as far ahead as possible. The two lenses therefore supplement each other in the manner explained.

I desire to call particular attention to the arrangement of the three groups of prisms. The horizontal prisms "C" being located slightly below the center of the lens projects a wide band of light onto the roadway and diffuses the same by the action of the vertical corrugations. From Figs. 3 and 6 it will be seen that the vertical corrugations on the horizontal prisms "C" are different in the middle than at the ends so as to permit the light to be given a better distribution.

Having now described my invention what I claim as new is:

1. An automobile headlight lens comprising, in combination, a circular lens having one surface plain and the other surface provided with two groups of arcuate prisms, one of said groups being located in the top portion of lens, the other being located in the bottom portion, said prisms being upwardly tapered, and concentric with the lens, and a group of straight horizontal prisms located between the two groups of arcuate prisms, the horizontal prisms being crossed with vertical corrugations.

2. A pair of lenses having arcuate prisms in the upper portions of the lenses, horizontal prisms in the middle portions, vertical fluted surfaces on the horizontal prisms, arcuate prisms in the bottom portions of lenses, one of the lenses having light refracting elements of greater refracting power than the other lens, the bases of all of said prisms being directed downwardly.

3. An automobile headlight lens having arcuate prisms at the bottom portion, projecting a beam of light diverging from the center, horizontal prisms crossed by vertical fluted surfaces through the middle portion for deflecting the light downward and dispersing it laterally, arcuate prisms in the upper portions of the lens projecting a beam with its rays converging toward the center of the lens.

In testimony whereof I affix my signature.

FRANK A. KENNEY.